United States Patent
Geisler et al.

(10) Patent No.: US 10,179,751 B2
(45) Date of Patent: Jan. 15, 2019

(54) METHOD FOR PRODUCING A MOLDED HEAT-INSULATING ELEMENT

(71) Applicant: Evonik Degussa GmbH, Essen (DE)

(72) Inventors: Matthias Geisler, Grosskrotzenburg (DE); Frank Menzel, Hanau (DE)

(73) Assignee: Evonik Degussa GmbH, Essen (DE)

(*) Notice: Subject to any disclaimer, the term of this patent is extended or adjusted under 35 U.S.C. 154(b) by 0 days.

(21) Appl. No.: 15/565,288

(22) PCT Filed: Mar. 31, 2016

(86) PCT No.: PCT/EP2016/057081
§ 371 (c)(1),
(2) Date: Oct. 9, 2017

(87) PCT Pub. No.: WO2016/162261
PCT Pub. Date: Oct. 13, 2016

(65) Prior Publication Data
US 2018/0065892 A1 Mar. 8, 2018

(30) Foreign Application Priority Data
Apr. 10, 2015 (DE) .................. 10 2015 206 433

(51) Int. Cl.
C04B 41/00 (2006.01)
C04B 30/02 (2006.01)
C04B 41/45 (2006.01)
C04B 41/49 (2006.01)
C04B 41/60 (2006.01)
C04B 41/64 (2006.01)

(52) U.S. Cl.
CPC ............ C04B 30/02 (2013.01); C04B 41/009 (2013.01); C04B 41/4519 (2013.01); C04B 41/4944 (2013.01); C04B 41/60 (2013.01); C04B 41/64 (2013.01)

(58) Field of Classification Search
CPC .............. C04B 41/009; C04B 41/4519; C04B 41/4905; C04B 41/64; C23C 16/52
See application file for complete search history.

(56) References Cited

U.S. PATENT DOCUMENTS

| 3,718,491 | A | * | 2/1973 | Yates | ...................... | C04B 28/24 106/287.11 |
| 4,529,532 | A | | 7/1985 | Gliem et al. | | |
| 5,034,423 | A | * | 7/1991 | Blount | ................... | C08G 18/42 521/106 |
| 5,290,350 | A | * | 3/1994 | Besnard | ................ | C04B 35/803 106/205.01 |
| 6,099,749 | A | * | 8/2000 | Boes | ...................... | C04B 18/147 252/62 |
| 6,340,374 | B1 | * | 1/2002 | Kato | ........................ | C09G 1/02 106/3 |
| 8,333,867 | B2 | * | 12/2012 | Pouchelon | .............. | B29C 66/71 156/325 |
| 2003/0113518 | A1 | * | 6/2003 | DeYoung | ................. | B41M 5/41 428/195.1 |
| 2006/0059709 | A1 | * | 3/2006 | Boara | ..................... | C03B 19/12 34/413 |
| 2006/0157101 | A1 | * | 7/2006 | Sakamoto | ............... | F25B 21/02 136/201 |
| 2006/0186089 | A1 | * | 8/2006 | Shida | ....................... | C09G 1/02 216/88 |
| 2010/0025373 | A1 | * | 2/2010 | Barthel | ................. | C01B 33/183 216/83 |
| 2011/0015288 | A1 | * | 1/2011 | Ranft | ................... | B01J 19/0093 521/119 |
| 2011/0129398 | A1 | * | 6/2011 | Markowz | ............... | B01J 20/041 423/230 |
| 2014/0150242 | A1 | | 6/2014 | Kratel et al. | | |

FOREIGN PATENT DOCUMENTS

DE 33 05 375 A1 8/1984
WO 2013/013714 A1 1/2013

OTHER PUBLICATIONS

Procter, P. et al., "Improved thermal conductivity in microelectronic encapsulants," 1991 Proceedings 41st Electronic Components & Technology Conference, Atlanta, GA, USA, 1991, pp. 835-842.*
Rao, A. Venkateswara, et al., "Synthesis of flexible silica aerogels using methyltrimethoxysilane (MTMS) precursor". Journal of Colloid and Interface Science 300 (2006) 279-285.*
Shukor, Faseha, et al., "Effect of ammonium polyphosphate on flame retardency, thermal stability and mechanical properties of alkali treated kenaf fiber filled PLA biocomposites". Materials and Design 54 (2014) 425-429.*
International Search Report dated Jul. 1, 2016 in PCT/EP2016/057081 filed Mar. 31, 2016.

* cited by examiner

Primary Examiner — Bret P Chen
(74) Attorney, Agent, or Firm — Oblon, McClelland, Maier & Neustadt, L.L.P.

(57) ABSTRACT

A process for producing an ammonia-treated hydrophilic thermal insulation molding which includes treating a thermal insulation molding containing hydrophilic silica with ammonia by introducing the thermal insulation molding into a chamber and supplying gaseous ammonia until a pressure difference Δp of ≥20 mbar is achieved. A process for producing a thermal insulation molding containing hydrophobic silica which includes treating the ammonia-treated hydrophilic thermal insulation molding with an organosilicon compound.

14 Claims, No Drawings

METHOD FOR PRODUCING A MOLDED HEAT-INSULATING ELEMENT

The invention relates to a process for producing a thermal insulation molding.

Binder-free thermal insulation moldings exhibit a volume expansion after the pressing operation. Said moldings become cracked and lose mechanical stability. Poor dimensional stability makes the fabrication of dimensionally accurate thermal insulation moldings difficult.

DE-A-3305375 discloses a process for producing binder-free thermal insulation moldings comprising mixing fumed silica, opacifiers and inorganic fibres in the presence of ammonia and subsequently pressing this thermal insulation mixture. It is essential here that the addition of ammonia is carried out prior to pressing. It is explicitly mentioned that treating the pressed sheet with gaseous ammonia does not achieve the desired result, namely a reduction in the volume expansion.

U.S. Pat. No. 6,099,749 discloses a process for compacting a mixture comprising fumed silica which comprises treating the mixture in the absence of liquid with a vapor comprising water and ammonia to achieve a weight gain of at least 0.5 wt % and subsequently pressing the thus treated mixture.

The disclosure in WO2004/109026 is similar. Disclosed therein is a process for producing a thermal insulation molding which comprises initially treating a thermal insulation mixture comprising fumed silica with gaseous ammonia and subsequently pressing the thus treated thermal insulation mixture into sheets. The ammonia is introduced in amounts of 0.1 to 50 Nl/10 kg of thermal insulation mixture during mixing. The ammonia may also be added after mixing but before the pressing operation.

The present inventors have now surprisingly found a way of improving the compressive strength of thermal insulation moldings even after pressing.

The present invention provides a process for producing an ammonia-treated hydrophilic thermal insulation molding which comprises treating a thermal insulation molding comprising hydrophilic silica with ammonia by introducing the thermal insulation molding into a chamber and supplying gaseous ammonia until a pressure difference $\Delta p$ of $\geq 20$ mbar is achieved.

The thermal insulation molding may be a sheet, a profile or a pipe. The process is particularly suitable for producing a thermal insulation sheet.

Here, $\Delta p = p2 - p1$ where $p1$=pressure in the chamber before introduction of the gaseous ammonia and $p2$=pressure in the chamber at which introduction of the gaseous ammonia is halted.

The process according to the invention is preferably carried out such that 50 mbar$\leq \Delta p \leq$5 bar. Particular preference is given to an embodiment where 100 mbar$\leq \Delta p \leq$500 mbar. It is very particularly preferred when 200 mbar$\leq \Delta p \leq$400 mbar.

In one particular embodiment of the invention the process is carried out such that the pressure in the chamber before introduction of the gaseous ammonia is not less than atmospheric pressure. In this case it is advantageous when atmospheric pressure$\leq p1 \leq$10 bar. In this superatmospheric pressure process the ammonia is "squeezed" into the pores of the thermal insulation molding comprising hydrophilic silica. This promotes the simultaneous process of diffusion of ammonia into the sample. Atmospheric pressure is about 1013 mbar.

Even more favorable results are obtained with an embodiment where the process is carried out such that the pressure in the chamber before introduction of the gaseous ammonia is below atmospheric pressure. In particular, it is advantageous when 0.1 mbar$\leq p1 <$atmospheric pressure mbar. Particular preference is given to a variant where 1$\leq p1 \leq$500 mbar. In this particular embodiment the gaseous ammonia is introduced into an evacuated chamber. In this subatmospheric pressure process the ammonia is "sucked" into the pores of the thermal insulation molding comprising hydrophilic silica and optimally distributed.

The chamber merely has to meet the requirement that it is capable of maintaining the pressures and temperatures necessary in the process according to the invention.

The process according to the invention employs a thermal insulation molding comprising hydrophilic silica. Generally, a thermal insulation mixture comprising the hydrophilic silica is charged into a pressing tool and compacted using pressing rams in one or more steps. The thermal insulation molding comprising the hydrophilic silica typically has a density of 30 to 500 g/l, preferably 70 to 350 g/l and particularly preferably between 120 to 200 g/l.

It has been found that the employed thermal insulation molding comprising hydrophilic silica may also comprise water. The process according to the invention may be carried out without any disadvantages with a water content range of up to 5 wt %. Generally, hydrophilic-silica-comprising thermal insulation moldings having a water content of from 0.5 to 3 wt % are employed.

It is likewise possible to introduce steam into the chamber. The proportion thereof should be not more than 10 vol % based on the total amount of gas and steam introduced.

By contrast, the thermal insulation molding comprising hydrophilic silica shall not comprise any binders since these can negatively affect the thermal insulation properties.

The duration for which the hydrophilic thermal insulation molding is kept in the chamber, starting from the point at which the gaseous ammonia is added, depends inter alia on the composition of the thermal insulation molding and on the thickness thereof. The duration is generally from 10 minutes to 100 hours, preferably 0.5 to 20 hours.

The suitable temperature in the chamber likewise depends on the composition of the thermal insulation molding and on the thickness thereof. The temperature at which the best results are to be expected is in the range between 0° C. and 100° C., preferably 15° C. to 90° C.

The thermal insulation molding may subsequently be subjected to thermal treatment to minimize the ammonia content. This is best effected under vacuum at elevated temperature, for example at 1 to 80 mbar and a temperature of 20° C. to 90° C. The thus treated thermal insulation molding preferably comprises less than 0.1 wt %, particularly preferably less than 100 ppm and very particularly preferably 1 to 20 ppm ammonia.

The main constituent of the thermal insulation mixture is hydrophilic silica. Suitable hydrophilic silicas are especially fumed silicas, precipitated silicas and/or a silicon dioxide aerogel.

The best results are obtained with fumed silicas. The fumed silica preferably has a BET surface area of 90 $m^2$/g or more, particularly preferably of 150 to 500 $m^2$/g. Fumed silicas are produced by flame hydrolysis of silicon compounds, for example chlorosilanes. This process comprises bringing a hydrolysable silicon halide to reaction with a flame formed by combustion of hydrogen and an oxygenous gas. The combustion flame here provides water for the hydrolysis of the silicon halide, and sufficient heat for the hydrolysis reaction. Silica produced in this way is termed fumed silica. This process initially forms primary particles which are virtually free of interior pores. These primary particles then fuse during the process via so-called "sinter necks" to afford aggregates. This structure renders fumed silica an ideal thermal insulation material since the aggregate structure minimizes heat transfer due to conductivity in the solid via the "sinter necks" and generates a sufficient level of porosity.

In addition the mixture may further comprise opacifiers, fibres and/or finely divided inorganic added substances. A typical composition is 45 to 95 wt %, preferably 55 to 90 wt %, silica, 5 to 30 wt %, preferably 7 to 15 wt %, opacifiers, 5 to 35 wt %, preferably 10 to 30 wt %, finely divided inorganic added substances and 0 to 12 wt %, preferably 1 to 5 wt %, fibres. The opacifiers may be titanium oxides, zirconium oxides, ilmenites, iron titanates, iron oxides, zirconium silicates, silicon carbide, manganese oxides, graphites and/or carbon blacks. The opacifiers generally have a particle size between 0.1 to 25 µm. In the case of silicon carbide and titanium oxides, the average particle diameter $d_{50}$ is preferably 1 to 10 µm, particularly preferably 2 to 8 µm.

In the context of the present invention a hydrophilic silica is to be understood as meaning a silica the surface of which bears no organic groups, such as alkyl groups for example, that would impart a hydrophobic, water-repelling character. On the contrary, the groups disposed at the surface shall consist completely or to the greatest possible extent of Si—OH and Si—O—Si groups. A silica is referred to as a hydrophobic silica when the Si—OH and Si—O—Si groups disposed at the surface are at least partly reacted with an organic compound which imparts a hydrophobic, water-repelling character to the material.

The invention further provides a process for producing a thermal insulation molding comprising hydrophobic silica which comprises treating the hydrophilic thermal insulation molding treated with ammonia in accordance with the invention with an organosilicon compound.

It is advantageous for this process when the ammonia-treated hydrophilic thermal insulation molding comprises not more than 2 wt % water. 0 to 1.5 wt % is particularly preferred.

One particular embodiment of the invention comprises carrying out the treatment in a chamber containing the hydrophilic thermal insulation molding treated with ammonia in accordance with the invention and introducing an organosilicon compound vaporous under the reaction conditions until a pressure difference $\Delta p$ of ≥20 mbar is achieved.

The organosilicon compound itself may be introduced into the chamber in liquid or vaporous form. When introduced in liquid form, by injection for instance, the organosilicon compound shall be converted into the vaporous state under the conditions prevailing in the chamber. It is preferable to introduce a vaporous organosilicon compound.

$\Delta p = p2 - p1$, where $p1$=pressure in the chamber before introduction of the organosilicon compound and $p2$=pressure in the chamber at which introduction of the organosilicon compound is halted. The process according to the invention is carried out such that preferably 50 mbar≤$\Delta p$≤5 bar, particularly preferably 100 mbar≤$\Delta p$≤500 mbar and very particularly preferably 200 mbar≤$\Delta p$≤400 mbar.

In one particular embodiment of the invention the process is carried out such that the pressure in the chamber before introduction of the organosilicon compound is less than atmospheric pressure. In particular, it is advantageous when 0.1 mbar≤$p1$≤atmospheric pressure. Particular preference is given to a variant where 1≤$p1$≤500 mbar. In this particular embodiment the organosilicon compound is thus introduced into an evacuated chamber. In this subatmospheric pressure process the organosilicon compound is "sucked" into the pores of the hydrophilic molding and optimally distributed.

The organosilicon compounds employed react with the silanol groups of the thermal insulation molding comprising hydrophilic silica and thus render said molding water repellent.

The process according to the invention may preferably employ as the organosilicon compound one or more organosilanes from the group consisting of $R_n$—Si—$X_{4-n}$, $R_3$Si—Y—Si$R_3$, $R_n$Si$_n$O$_n$, $(CH_3)_3$—Si—(O—Si$(CH_3)_2)_n$—OH, HO—Si$(CH_3)_2$—(O—Si$(CH_3)_2)_n$—OH, where n=1-8; R=—H, —CH$_3$, —C$_2$H$_5$; X=—Cl, —Br; —OCH$_3$, —OC$_2$H$_5$, —OC$_3$H$_8$, Y=NH, O.

Explicit mention is made of $(CH_3)_3$SiCl, $(CH_3)_2$SiCl$_2$, CH$_3$SiCl$_3$, $(CH_3)_3$SiOC$_2$H$_5$, $(CH_3)_2$Si(OC$_2$H$_5)_2$, CH$_3$Si(OC$_2$H$_5)_3$, $(CH_3)_3$SiNHSi$(CH_3)_3$, $(CH_3)_3$SiOSi$(CH_3)_3$, octamethyltetracyclosiloxane, hexamethyltricyclosiloxane and $(CH_3)_3$Si(OSi$(CH_3)_2)_4$OH. Preference is given to employing $(CH_3)_3$SiCl, $(CH_3)_2$SiCl$_2$, CH$_3$SiCl$_3$, (CH$_3)_3$SiNHSi$(CH_3)_3$ and $(CH_3)_8$Si$_4$O$_4$. Particular preference is given to employing $(CH_3)_3$SiNHSi$(CH_3)_3$.

Depending on the organosilicon compound employed the temperature in the chamber shall be 20° C. to 300° C. Preference is given to choosing a temperature from 50° C. to 200° C.

The duration for which the hydrophilic, ammonia-treated thermal insulation molding is kept in the chamber, starting from the point at which the organosilicon compound is added, depends inter alia on the composition of the thermal insulation molding and on the thickness thereof. The duration is generally from 1 minute to 1 hour, preferably 2 to 20 minutes.

On termination of the treatment any excess organosilicon compound and reaction products may be removed from the now hydrophobic thermal insulation molding by heating.

One particular embodiment of the invention provides a process for producing thermal insulation moldings comprising hydrophobic silica where the hydrophobization is carried out with $(CH_3)_3$SiNHSi$(CH_3)_3$ and where the ammonia formed during the hydrophobizing step is employed in the treatment of hydrophilic thermal insulation molding. This process is characterized in that it comprises a) treating a thermal insulation molding comprising hydrophilic fumed silica with ammonia by introducing said molding into a chamber and supplying gaseous ammonia until a pressure difference $\Delta p$ of ≥20 mbar is achieved, b) subsequently treating the thus treated thermal insulation molding with $(CH_3)_3$Si—NH—Si$(CH_3)_3$ thus forming ammonia, c) supplying the thus obtained ammonia, optionally with further ammonia, to another chamber in which a thermal insulation molding comprising hydrophilic fumed silica is disposed, wherein ammonia is supplied until a pressure difference $\Delta p$ of ≥20 mbar is achieved.

EXAMPLES

Carried out as per DIN ISO 844:2009 and EN 826:1996. In contrast to the test specifications the present procedure comprises stressing samples to 1 bar and evaluating the compression values. In addition only a single measurement was carried out without acclimatizing the specimens prior to testing.

Example 1a (Comparative Example)

A thermal insulation mixture composed of 76.2 wt % AEROSIL 300 (fumed silica; Evonik Industries; BET surface area 300 m$^2$/g), 19 wt % silicon carbide (Silcar G14; ESK; d$_{50}$=2.73 μm) and 5 wt % glass fibres (average fibre diameter about 9 μm; length about 6 mm) is pressed into a thermal insulation sheet. The thermal insulation sheet has a density of 149 g/cm$^3$.

Example 2a (Inventive)

A section of the thermal insulation sheet from example 1a having dimensions of 70×70×20 mm is transferred into a desiccator. The pressure in the desiccator is reduced to 20 mbar. Sufficient vaporous ammonia is then introduced into the desiccator to raise the pressure to 300 mbar. The thermal insulation sheet is then kept in the desiccator for 2 hours. The density is unchanged.

Example 2b (Inventive)

analogous to example 2a. The thermal insulation sheet is kept in the desiccator for 20 hours.

Example 2c (Inventive)

analogous to example 2a, but using the thermal insulation sheet from example 1b instead of 1a. The thermal insulation sheet is kept in the desiccator for 100 hours.

The table shows the compression values for the thermal insulation sheets. It is apparent that the compression values for the thermal insulation sheets produced by the process according to the invention are significantly lower than for untreated sheets. The results also show that, contrary to the teaching of the prior art, previously pressed thermal insulation sheets are hardened by the treatment.

TABLE

| | Compression under compressive stress | |
|---|---|---|
| Example | Reaction time [h] | Compression at 1 bar [%] |
| 1a | — | 16.4 |
| 2a | 2 | 14.9 |
| 2b | 20 | 8.8 |
| 2c | 100 | 9.2 |

The invention claimed is:

1. A process for producing an ammonia-treated hydrophilic thermal insulation molding, comprising treating a thermal insulation molding comprising hydrophilic silica with ammonia, such that the thermal insulation molding is introduced into a chamber and gaseous ammonia is supplied until a pressure difference Δp of ≥20 mbar is achieved.

2. The process of claim 1, wherein a pressure in the chamber before introduction of the gaseous ammonia is below atmospheric pressure.

3. The process according to claim 1, wherein the hydrophilic thermal insulation molding comprises up to 5 wt % water.

4. The process of claim 1, further comprising introducing steam into the chamber.

5. The process of claim 1, wherein the hydrophilic thermal insulation molding kept in the chamber for 1 to 100 hours starting from the point at which the gaseous ammonia is added.

6. The process of claim 1, wherein a temperature in the chamber is between 0° C. and 100° C.

7. The process of claim 1, wherein the hydrophilic silica is a fumed silica.

8. A process for producing a thermal insulation molding comprising hydrophobic silica, comprising treating the hydrophilic thermal insulation molding obtained by the process of claim 1 with an organosilicon compound.

9. The process of claim 8, wherein the treatment with the organosilicon compound comprises introducing the hydrophilic thermal insulation molding treated with ammonia into a chamber and introducing a vaporous organosilicon compound into the chamber until a pressure difference Δp of ≥20 mbar is achieved.

10. The process of claim 9, wherein the ammonia-treated hydrophilic thermal insulation molding comprises not more than 2 wt % water.

11. The process of claim 9, wherein a pressure in the chamber before introduction of the organosilicon compound is below atmospheric pressure.

12. The process of claim 9, wherein a temperature in the chamber is 20° C. to 300° C.

13. The process of claim 9, wherein the ammonia-treated hydrophilic thermal insulation molding is kept in the chamber for 1 minute to 1 hour starting from the point at which the organosilicon compound is added.

14. A process for producing a thermal insulation molding comprising hydrophobic silica, the process comprising:
   a) treating a thermal insulation molding comprising hydrophilic fumed silica with ammonia by introducing the molding into a chamber and supplying gaseous ammonia until a pressure difference Δp of ≥20 mbar is achieved,
   b) subsequently treating the thus treated thermal insulation molding with (CH$_3$)$_3$Si—NH—Si(CH$_3$)$_3$ thus forming ammonia, and
   c) supplying the thus obtained ammonia, optionally with further ammonia, to another chamber in which a thermal insulation molding comprising hydrophilic fumed silica is disposed, wherein ammonia is supplied until a pressure difference Δp of ≥20 mbar is achieved.

* * * * *